United States Patent Office 2,865,894
Patented Dec. 23, 1958

2,865,894
POLYAMIDES FROM DICYCLOHEXYLADIPIC ACID

Harry Greenberg and Raymond W. Horst, Cincinnati, Ohio, assignors to National Distillers and Chemical Corporation, New York, N. Y., a corporation of Virginia No Drawing. Application June 15, 1955
Serial No. 515,777

18 Claims. (Cl. 260—78)

The present invention relates to new compositions of matter and their preparation and, more particularly, to novel synthetic linear condensation polyamides possessing fiber-forming properties.

In general, the novel compositions of matter embodied herein are prepared by reacting a suitable diamine with a particular dicarboxylic acid reactant or an amide-forming derivative of said dicarboxylic acid reactant, the reaction being carried out under condensation polymerization conditions until polyamides of relatively high molecular weight are produced. As is described hereinafter, and by practice of embodiments of the invention, synthetic linear polyamides may be produced possessing highly useful properties and, particularly depending on the dicarboxylic acid reactant employed, the polyamides may be varied as to fiber-forming characteristics, cold drawable properties, and others.

In preparation of the novel products embodied herein, the diamine reactant may comprise a primary or secondary diamine characterized by having at least one hydrogen atom attached to each nitrogen atom. Thus, suitable diamines include di-primary amines, primary-secondary amines, and di-secondary amines. Of such amines, aliphatic diamines are preferred, such amines being characterized by having the nitrogen atoms attached to aliphatic carbon atoms. More preferably, the aliphatic diamines contemplated for usage herein are those of relatively long chain length, as for example, a chain length of four or more carbon atoms, with specific examples thereof being aliphatic diamines such as tetramethylene diamine, pentamethylene diamine, hexamethylene diamine, octamethylene diamine, decamethylene diamine, and the like. Structurally, diamines suitable for practice of this invention may be defined as having the formula $NH_2CH_2RCH_2NH_2$ in which R is a divalent hydrocarbon radical free from olefinic and acetylenic unsaturation and which has a chain length of at least two carbon atoms. Although such amines in which R is an aliphatic chain are preferred, diamines of the aforesaid structural formula in which R may be alicyclic, aromatic or araliphatic are also contemplated.

An important aspect of this invention is the dicarboxylic acid reactant employed for reaction with the diamine or mixtures thereof. For practice of this invention, the dicarboxylic acid reactant comprises a dicyclohexyladipic acid with a specific example thereof being $\alpha,\alpha'$-dicyclohexyladipic acid. Thus, as embodied herein, the polyamides to which the invention relates may be prepared by reaction between a suitable diamine and a dicyclohexyladipic acid, but more preferably and as described more fully hereinafter, by reaction of a suitable diamine with a dicarboxylic acid reactant in which dicyclohexyladipic acid is a component of said reactant in mixture with other dibasic carboxylic acids, illustrative of which are acids such as adipic acid, suberic acid, sebacic acid, and others. Thus, polyamides as embodied herein are characterized by containing units of the following structure

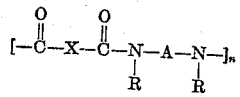

in which X is a hydrocarbon portion of a dicarboxylic acid, A is a hydrocarbon portion of a diamine, and R is hydrogen, alkyl or an aryl radical; and further characterized in that the polyamides comprise units of the aforesaid structure in which X is the hydrocarbon portion of a dicyclohexyladipic acid. Thus, in embodiments wherein the dicarboxylic acid reactant comprises $\alpha,\alpha'$-dicyclohexyladipic acid, the polyamides embodied herein are characterized by containing units of the following structure

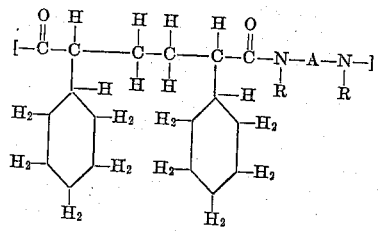

in which R and A have the significance aforedescribed.

The polyamides embodied herein may be prepared by heating in substantially equimolecular amounts a suitable diamine and a dicarboxylic acid reactant comprising dicyclohexyladipic acid under condensation polymerization conditions, generally from about 180 to about 300° C., in the presence or absence of a diluent, until relatively high molecular weight linear condensation polyamides are obtained, and preferably until the polyamides possess fiber-forming properties. Preferably, the polyamides embodied herein are prepared by use of a dicarboxylic acid reactant comprising a selected mixture of dicarboxylic acids whereby the resulting polyamides are fiber-forming to fibers of excellent cold-drawable characteristics. The preparation of polyamides as embodied herein may be carried out in any of several ways. For example, the diamine and dicarboxylic acid reactant may be intimately mixed in proper proportions and the mixture subjected to condensation polymerization conditions in which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

As aforesaid, polyamides as embodied herein may also be prepared by use of an amide-forming derivative of the dicarboxylic acid component or components. For such preparations, use is contemplated of amide-forming derivatives of dicyclohexyladipic acid, and/or of other dibasic carboxylic acids used in mixture therewith, such amide-forming derivatives including anhydrides, amides, acid halides, half esters and diesters which are known to form amides when reacted with a primary or secondary amine. Specific amide-forming derivatives contemplated for use herein include esters of dicyclohexyladipic acid, illustrative of which are the diethyl and dimethyl esters of $\alpha,\alpha'$-dicyclohexyladipic acid.

In order to further describe the invention, but without intent of limitation, the following illustrative embodiments are set forth. In the preparations set forth, the reactions were carried out under a blanket of dry oxygen-free nitrogen at both atmospheric and subatmospheric pressure in all-glass polymerization tubes heated to known temperatures by provision of vapor jackets of stable compounds at their boiling points.

EXAMPLE I

*Co-polymer of 50% dicyclohexyladipic acid and 50% sebacic acid with hexamethylene diamine*

One part of hexamethylene diammonium dicyclohexyladipate, made by neutralizing the dibasic acid with hexamethylene diamine to pH 8.3 at 10% concentration in water, was mixed with 1 part hexamethylene diammonium sebacate (M. P. 178–179° C.). The resulting slurry was polymerized by first distilling off the free water at atmospheric pressure and then heating for 4 hours at 260° C. under oxygen-free nitrogen. Vacuum was then applied at 260° C. for 4 more hours to complete the elimination of water whereby a clear copolyamide was produced. Fibers drawn from the copolyamide melt possessed cold drawable properties.

The polyamide as produced herein also possessed properties whereby it could be pressure molded into predetermined shapes of excellent dimensional stability.

EXAMPLE II

*Co-polymer of 25% dicyclohexyladipic acid and 75% sebacic acid with hexamethylene diamine*

One part of hexamethylene diammonium dicyclohexyladipate as a 10% solution in water at pH 8.3 was slurried with 3 parts of dry hexamethylene diammonium sebacate (M. P. 178–179° C.). The mixture was polymerized by heating at 260° C. for 2 hours, and for 1 hour at 283° C., the final traces of water being removed under reduced pressure (0.3 mm. Hg) at the latter temperature by heating for an additional 1.5 hours. The copolyamide thus produced was a white translucent, hard material having a softening point of 198° C. Fibers drawn from a melt of this material possessed excellent cold draw properties. The polyamide thus produced also possessed properties whereby it could be pressure molded into predetermined shapes of excellent dimensional stability.

EXAMPLE III

*Co-polymer of 50% dicyclohexyladipic acid and 50% adipic acid with octamethylene diamine*

Equal parts of the salts of dicyclohexyladipic acid and adipic acid with octamethylene diamine (M. P. 219° C. and 156° C., respectively) were heated in a polymerization tube at 260° C. in a nitrogen atmosphere at atmospheric pressure for 18 hours and then at reduced pressure (0.3 mm. Hg) at this temperature for 4 hours followed by 4 more hours at 283° C.

The final product was a clear copolyamide with a softening point of 153° C. that possessed fiber-forming properties and the fibers from which could be cold drawn. The polyamide was also suitable as a pressure molding composition with provision of predetermined shapes of excellent dimensional stability.

EXAMPLE IV

Hexamethylene diammonium dicyclohexyladipate, made by neutralizing the acid with hexamethylene diamine to pH 8.31 at 10% concentration in water, was heated at 260° C. for one hour, at 283° C. for one-half hour, at 332° C. for 2½ hours and at 332° C. at 0.3 Hg pressure whereby a hard polyamide was produced.

EXAMPLE V

A hexamethylene salt of dicyclohexyladipic acid having a melting point of 217–219° C. was heated at 260° C. for 30 minutes, at 283° C. for 45 minutes, at 320° C. for 1 hour, and at 320° C. for 30 minutes at 0.3 mm. Hg pressure whereby a hard polyamide was produced.

The dicyclohexyladipic acid utilized in the foregoing illustrative embodiments was prepared by mixing α,α'-diphenyladipic acid (neutralization equivalent 149.2) with glacial acetic acid and hydrogenating the mixture, in presence of a hydrogenation catalyst (palladium on carbon) in an amount of 3% by weight of the diphenyladipic acid at 1500–2000 p. s. i., pressure and 150° C. for six hours. The amount of hydrogen consumed was substantially equivalent to that theoretically required to convert the diphenyladipic acid to dicyclohexyladipic acid. Following the hydrogenation, the resulting mixture was filtered to remove the catalyst, and the filtrate was distilled to remove the acetic acid whereby a white crystalline product (dicyclohexyladipic acid) having a neutralization equivalent of 155.2 was produced.

As is apparent from the foregoing illustrative embodiments, synthetic linear polyamides can be prepared, by use of a dicarboxylic reactant comprising dicyclohexyladipic acid, which possess fiber-forming characteristics and other improved properties. In the use, as the dicarboxylic acid reactant, of dicyclohexyladipic acid or an amide-forming derivative thereof, a preferred aspect of the invention is that the polyamides be derived by reaction with a relatively long chain aliphatic diamine or mixtures of such amines. In particular, and for formation of polyamides, from dicyclohexyladipic acid, that possess fiber-forming properties, diamines of at least six carbon atoms should be employed, specific examples thereof being diamines such as hexamethylene diamine, octamethylene diamine, decamethylene diamine, and the like. On the other hand, and with reference to the aspect of the invention wherein the dicarboxylic acid reactant comprises dicyclohexyladipic acid, in mixture with another dicarboxylic acid, judicious use of the diamine and acid components provides polyamides that are fiber-forming to cold-drawable fibers and are of improved transparency characteristics in contrast with the usual translucency and opaqueness of substantially corresponding polyamides in which dicyclohexyladipic acid is not employed as a component of the dibasic acid reactant. For example, and as set forth in Example Nos. I and III, the polyamide produced therein by reaction of the defined diamines and mixtures of dicyclohexyladipic acid with adipic acid or sebacic acid produced a clear polyamide. In the use of a dicarboxylic acid reactant comprising dicyclohexyladipic acid and another dibasic carboxylic acid, the proportional amount of dicyclohexyladipic acid to the other acid may be varied over a rather wide range, depending upon the particular results desired and the particular dicarboxylic acid employed in addition to dicyclohexyladipic acid. Preferably, the acid other than dicyclohexyladipic acid is a relatively long chain aliphatic dicarboxylic acid having from about six to about ten carbon atoms with suitable illustrations thereof being adipic acid, suberic acid, sebacic acid, and others. The relative amount of dicyclohexyladipic acid employed in combination with another dibasic acid as aforedescribed may be varied depending upon the particular results desired. However, for production of polyamides that are fiber-forming to cold-drawable fibers, and which generally possess improved clarity characteristics over the corresponding polyamides in which dicyclohexyladipic acid is not a component of the dibasic reactant, the polyamides as embodied herein are generally prepared by reacting, under condensation polymerization conditions, a suitable diamine and a dicarboxylic acid reactant comprising from more than about 25% up to about 75% of dicyclohexyladipic acid in mixture with an aliphatic dibasic acid, such as adipic acid, sebacic acid, and the like. Preferred dicarboxylic acid reactants for preparation of clear polyamides that are fiber-forming to cold-drawable fibers comprise a mixture of substantially equal parts of dicyclohexyladipic acid and an aliphatic dicarboxylic acid, illustrations of which are adipic acid, sebacic acid, and the like.

As is apparent from the foregoing, practice of the invention with dibasic reactants comprising dicyclohexyladipic acid provides synthetic linear polyamides that are useful not only as fiber-forming materials, but also as molding plastics and film-forming substances. Moreover, and as also aforesaid, the use of dicyclohexyladipic acid in combination with other dibasic carboxylic acids such as the relatively long chain straight chain aliphatic dicarboxylic acids provides copolyamides that not only possess excellent cold-draw characteristics but, in addition, are of particularly improved characteristics with respect to clarity. Other advantageous properties that result from the use of dicyclohexyladipic acid in preparation of the polyamides are, in general, improvements in resistance to water absorption. This is a particularly important property for such uses as photographic film, precision molded articles and the like where water absorption at high humidities results in poor dimensional stability. Thus, it was found that the water absorption characteristics of the polymer prepared in Example I is only 3% compared with a water absorption of 8% for a commercial nylon prepared from hexamethylene diamine and adipic acid. Moreover, by use of dicyclohexyladipic acid in preparation of polyamides as embodied herein, polyamides may be prepared possessing melting point characteristics such that, for polyamide type materials, are capable of being readily processed, including improved extrudability characteristics with minimized requirements for use, if any, of lubricants for extrusion. Other advantageous properties that may be obtained from use of dicyclohexyladipic acid in preparation of polyamides include reduced shrinkage from mold dimensions, improved electrical insulating and machinability characteristics.

In practice of the invention with respect to embodiments for formation of polyamides that are fiber-forming, the polymerization reaction is carried out until the reaction product has a sufficiently high molecular weight to exhibit fiber-forming properties. The fiber-forming stage is reached when the molten polymer, if touched with a rod, results in a continuous filament of considerable strength and pliability upon drawing the rod away. The fiber-forming polyamides of this invention may be spun into continuous filaments by any of several ways as, for example, in accordance with known methods including attachment of a suitable spinnerette to the bottom of the reaction vessel for direct spinning of the polyamide from the reaction vessel; or by dissolving the polyamide in a suitable solvent and extruding the resulting solution through orifices into a liquid that dissolves the solvent but not the polyamides, and collecting the filaments thus formed in a suitable revolving drum or spindle; or by extruding a solution of the polyamide into a heated chamber where the solvent is removed by evaporation; or by extruding the molten polyamide through orifices into the atmosphere where it congeals into a filament.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A linear condensation polyamide characterized by containing repeating units of the following structure

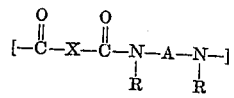

in which X is a hydrocarbon portion of a dicarboxylic acid, A is a hydrocarbon portion of a diamine, and R is a member from the group consisting of hydrogen, alkyl and aryl radicals and further characterized in containing such units in which X is the hydrocarbon portion of $\alpha,\alpha'$-dicyclohexyladipic acid.

2. A synthetic linear condensation polyamide characterized by containing repeating units of the following structure

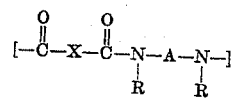

in which X is a hydrocarbon portion of a dicarboxylic acid, A is a hydrocarbon portion of a diamine, and R is a member from the group consisting of hydrogen, alkyl and aryl radicals, and further characterized in containing such units in which X is the hydrocarbon portion of $\alpha,\alpha'$-dicyclohexyladipic acid and such units in which X is the hydrocarbon portion of an aliphatic dicarboxylic acid.

3. A polyamide, as defined in claim 2, wherein A is the hydrocarbon residue of a saturated aliphatic diamine and R is hydrogen.

4. A process which comprises heating at polyamide-forming temperatures a diamine and a dicarboxylic acid reactant in substantially equimolecular proportions, said dicarboxylic acid reactant comprising a member from the group consisting of $\alpha,\alpha'$-dicyclohexyladipic acid and amide-forming derivatives of such an acid, and continuing the heat treatment until a linear polyamide is produced.

5. A process which comprises heating at polyamide-forming conditions a saturated aliphatic diamine and a dicarboxylic acid reactant in substantially equimolecular proportions and continuing the heat treatment until a linear polyamide is produced, said dicarboxylic acid being characterized by comprising $\alpha,\alpha'$-dicyclohexyladipic acid.

6. A process which comprises heating at polyamide-forming conditions a diamine having at least one hydrogen attached to each of the nitrogen atoms and a dicarboxylic acid reactant in substantially equimolecular proportions, and continuing the heat treatment until a linear polyamide is produced, said dicarboxylic acid reactant being characterized by comprising $\alpha,\alpha'$-dicyclohexyladipic acid.

7. A process, as defined in claim 6, wherein the diamine is a saturated aliphatic diamine.

8. A process, as defined in claim 6, wherein the dicarboxylic acid reactant comprises $\alpha,\alpha'$-dicyclohexyladipic acid and a saturated aliphatic dicarboxylic acid.

9. A process, as defined in claim 8, wherein the dicarboxylic acid reactant comprises from more than about 25 and up to about 75% by weight of $\alpha,\alpha'$-dicyclohexyladipic acid.

10. A process which comprises heating at polyamide-forming conditions a salt of a dicarboxylic acid reactant and a diamine having at least one hydrogen attached to each of the nitrogen atoms, and continuing the heat treatment until a linear polyamide is produced, said dicarboxylic acid reactant being characterized by comprising a member from the group consisting of $\alpha,\alpha'$-dicyclohexyladipic acid and amide-forming derivatives of such an acid.

11. A process which comprises heating at polyamide-forming conditions a salt of $\alpha,\alpha'$-dicyclohexyladipic acid and a diamine having at least one hydrogen attached to each of the nitrogen atoms, and continuing the heat treatment until a linear polyamide is produced.

12. A process which comprises heating, at polyamide-forming conditions, a mixture of (a) a salt of $\alpha,\alpha'$-dicyclohexyladipic acid and a diamine having at least one hydrogen attached to each of the nitrogen atoms and (b) a salt of a saturated aliphatic dicarboxylic acid and said diamine, and continuing the heat treatment until a linear copolyamide is produced.

13. A process which comprises heating, at polyamide-forming conditions (a) a salt of $\alpha,\alpha'$-dicyclohexyladipic acid and a saturated aliphatic diamine having at least one hydrogen attached to each of the nitrogen atoms in mixture with (b) a salt of a saturated aliphatic dicarboxylic acid and said diamine, and continuing the heat treatment until a linear copolyamide is produced.

14. A process, as defined in claim 13, wherein the salt of α,α'-dicyclohexyladipic acid comprises from more than 25 and up to about 75% by weight of the mixture with said salt of the saturated aliphatic dicarboxylic acid.

15. A synthetic linear condensation polyamide characterized by containing repeating units of the following structure

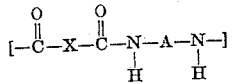

in which X is the hydrocarbon portion of a dicarboxylic acid, A is the hydrocarbon portion of a diamine, and further characterized in containing such units in which X is the hydrocarbon portion of α,α'-dicyclohexyladipic acid and such units in which X is the hydrocarbon portion of a saturated aliphatic dicarboxylic acid.

16. A polyamide, as defined in claim 15, wherein from about 25 to about 75% of the units consist of such units in which X is the hydrocarbon portion of α,α'-dicyclohexyladipic acid.

17. A polyamide, as defined in claim 15, wherein about 50% of the units are such units in which X is the hydrocarbon portion of α,α'-dicyclohexyladipic acid.

18. A polyamide, as defined in claim 15, wherein from about 25 to about 75% of the units consist of such units in which X is the hydrocarbon portion of α,α'-dicyclohexyladipic acid, the remainder of such units consist of such units in which X is the hydrocarbon portion of a saturated aliphatic dicarboxylic acid of six to ten carbon atoms, and A is the hydrocarbon portion of a saturated aliphatic diamine of at least six carbon atoms.

References Cited in the file of this patent

UNITED STATES PATENTS

| | | |
|---|---|---|
| 2,252,554 | Carothers | Aug. 12, 1941 |
| 2,533,455 | Hagemeyer | Dec. 12, 1950 |

FOREIGN PATENTS

| | | |
|---|---|---|
| 889,332 | France | Sept. 27, 1943 |